United States Patent Office 3,391,106
Patented July 2, 1968

3,391,106
ULTRAVIOLET LIGHT STABILIZED, 1-OLEFIN
RESIN COMPOSITION
Melvin S. Bloom and Gordon C. Newland, Kingsport,
Tenn., assignors to Eastman Kodak Company, Rochester, N.Y., a corporation of New Jersey
No Drawing. Filed Aug. 13, 1965, Ser. No. 479,632
12 Claims. (Cl. 260—45.8)

ABSTRACT OF THE DISCLOSURE

A thermoplastic composition comprising a normally solid poly-1-olefin resin and a stabilizing amount of a material selected from the 2-imino-4-thiazolines represented by the formula:

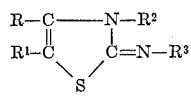

wherein said material is present at a concentration in a range of about 0.1 to about 10% by weight of said resin.

---

This invention resides in the chemical arts. It pertains to 1-olefin resins and relates to the problem of stabilizing them relative to the degradative effects of ultraviolet light.

Normally solid polymers of 1-olefins, such as normally solid polyethylene and crystalline polypropylene, are thermoplastic, synthetic resins which have gained widespread use as materials of construction. However, as is well known, normally solid, 1-olefin resins undergo photochemical degradation when exposed to ultraviolet light. This effect is frequently termed weathering. It appears to be a photooxidation process which causes rupture of the polymer chains and formation of carbonyl ($=C=O$) groups. As this degradation progresses, articles manufactured from 1-olefin resins tend to crack, become brittle and lose tensile strength to the extent of mechanical failure.

This invention is based upon the discovery that certain 2-imino-4-thiazolines confer on 1-olefin resins a high degree of stability to embrittlement by action of ultraviolet light.

In summary, this invention comprises a normally solid, thermoplastic composition consisting essentially of normally solid, 1-olefin resin and, at a concentration sufficient to substantially inhibit ultraviolet light degradation of said resin, material selected from the imino-4-thiazolines represented by the formula:

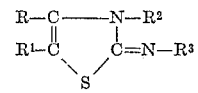

wherein R and $R^1$ are radicals independently selected from the group consisting of hydrogen, $C_1$–$C_{18}$ alkyl, phenyl, hydroxyphenyl and ($C_1$–$C_{18}$ alkoxy) phenyl radicals; $R^2$ is a radical selected from the group consisting of ($C_1$–$C_{18}$ alkyl) phenyl, hydroxyphenyl, ($C_1$–$C_{18}$ alkoxy) phenyl, dimethylaminophenyl, dihydroxyphenyl, di ($C_1$–$C_{18}$ alkoxy) phenyl, hydroxy ($C_1$–$C_{18}$ alkoxy) phenyl, acyl and aroyl; and $R^3$ is a radical selected from the group consisting of hydrogen, ($C_1$–$C_{18}$ alkyl) phenyl, hydroxyphenyl, ($C_1$–$C_{18}$ alkoxy) phenyl, dimethylaminophenyl, dihydroxyphenyl, di ($C_1$–$C_{18}$ alkoxy) phenyl, hydroxy ($C_1$–$C_{18}$ alkoxy) phenyl, acyl and aroyl.

The normally solid, 1-olefin resin component of the normally solid plastic composition of this invention consists essentially of at least one, normally solid, 1-olefin polymer. Such a polymer, commonly referred to generically as a poly-α-olefin, is one which is derived from a 1-monoolefinic hydrocarbon having 2–20 carbon atoms, generally 2–10 carbon atoms and usually 2–6 carbon atoms. It is also provided by the normally solid copolymers which include graft polymers, addition polymers, block copolymers and the like, of 1-monoolefinic hydrocarbons having 2–20 carbon atoms, generally 2–10 carbon atoms and usually 2–6 carbon atoms as well as of these 1-monoolefinic hydrocarbons and other compounds. Examples of a normally solid polymer derived from a 1-monoolefinic hydrocarbon having 2–20 carbon atoms include the linear and branched, low density and high density, crystalline and amorphous, normally solid homopolymers and copolymers of ethylene, propylene, 1-butene, isobutylene, 1-pentene, 2-methyl-1-pentene, 3-methyl-1-butene, 1-hexene, 3,3-dimethyl-1-butene, 1-heptene, 1-octene, 1-nonene, 1-decene, 4-methyl-1-pentene, 4-methyl-1-hexene, 5-ethyl-1-hexene, 6-methyl-1-heptene, 6-ethyl-1-heptene, styrene, allyl benzene, and the like. Processes for preparing a normally solid, 1-olefin polymer are well known and described in detail in the prior art. See, for example, the U.S. Patent No. 2,153,553, to Fawcett et al., U.S. Patent No. 2,912,429, to Cash and the U.S. Patent No. 2,917,500, to Hagemeyer et al. In general, a normally solid, 1-olefin resin is a thermoplastic material which at 20° C. is solid. It includes the so-called poly-α-olefin waxes which usually have average molecular weights in a range from about 3000 to about 12,000.

The normally solid plastic composition of this invention, in addition to at least one normally solid, 1-olefin resin, can also comprise other polymeric components. Thus, it can comprise a normally solid resin derived from another 1-monoolefinic hydocarbon having 2–20 carbon atoms. It can comprise a different kind of polymer, generally present as a physical property improver.

The 2-imino-4-thiazolines of this invention function as ultraviolet light inhibitors for 1-olefin resins. Examples of these compounds include:

2-imino-3-(p-hydroxyphenyl)-4-methyl-4-thiazoline
2-imino-(3-p-methoxyphenyl)-4-methyl-4-thiazoline
2-imino-3-(p-hydroxyphenyl)-4-methyl-5-phenyl-4-thiazoline
2-(p-hydroxyphenylimino)-3-(p-hydroxyphenyl)-4-methyl-4-thiazoline
2-(p-dimethylaminophenylimino)-3-(p-dimethylaminophenyl)-4-methyl-4-thiazoline
2-(p-methoxyphenylimino)-3-(p-methoxyphenyl)-4-methyl-4-thiazoline
2-(p-hydroxyphenylimino)-3-(p-hydroxyphenyl)-4-methyl-5-phenyl-4-thiazoline
2-[N-(p-methoxyphenyl)acetamido]-4-methylthiazole
2-acetimido-3-(p-methoxyphenyl)-4-methyl-4-thiazoline
2-(p-methoxyphenylimino)-3-acetyl-4-methyl-4-thiazoline The 2-imino-4-thiazolines of this invention can be readily synthesized. Usually 2-imino-4-thiazolines are obtained from 1,3-disubstituted thioureas. They can be prepared from 1-substituted thioureas by reacting the thiourea with a haloaldehyde or haloketone (or aldehyde or ketone with halogen) under acidic conditions. Acylation of 2-imino-4-thiazolines yields the corresponding 2-acylimino derivative. Acylation of 2-aminothiazoles under acidic conditions yields the 2-substituted imino-3-acyl-4-thiazoline.

The concentration of the material selected from the 2-imino-4-thiazolines of this invention, when incorporated into the 1-olefin resin component to form the plastic composition of this invention, depends generally upon the degree of ultraviolet light stabilization desired. This in turn depends upon a number of factors including subsequent environmental conditions to which the plastic composition is intended to be exposed. In general, however, a concentration of the ultraviolet light stabilizer of this invention in a range from about 0.1 to about 10% by weight of the total 1-olefin resin content of the composition is sufficient for satisfactory results in most end uses of the composition.

The normally solid, 1-olefin resin composition of this invention can also comprise other additives such as, for example, antioxidants, thermal stabilizers, anticorrosion additives, antistatic agents, foaming agents, plasticizers, colorants such as dyes and pigments, waxes, mold relief agents, slip agents, antiblocking agents, fillers, extenders, and the like, including physical property improvers other than polymeric compounds.

The normally solid, 1-olefin resin composition of this invention is made by incorporating the material selected from the 2-imino-4-thiazolines of this invention into the normally solid 1-olefin resin component. Generally, such incorporation is performed by any one of a number of known methods, such as, for example, roll compounding, extrusion, solvent mixing and the like. For instance, such incorporation can be performed by heating or otherwise softening the normally solid resin component to a workable consistency and then working in, as by roll compounding, the material selected from the group until a substantially uniform blend or dispersion is obtained. Generally, such incorporation takes place at the same time that other additives are normally incorporated into the 1-olefin resin component and usually along with such other additives as the formulation of the particular plastic composition requires.

The normally solid plastic composition of this invention is useful in coatings and as a material of construction for shaped articles. Thus, the composition can be made into various shaped articles such as, for example, pellets, sheeting, films, bars, tubes, filaments, fibers, specially shaped structural elements and the like as by conventional casting and molding techniques which include extrusion, blow molding and the like.

This invention is further illustrated by the following examples of various aspects thereof, including preferred specific embodiments of the invention. This invention is not limited to these specific embodiments unless otherwise indicated.

Example 1

This example illustrates the synthesis of 2-imino-3-(p-hydroxyphenyl)-4-methyl-4-thiazoline.

2.8 grams (0.03 mole) of chloroacetone, 5.0 grams (0.03 mole) of 1-(p-hydroxyphenyl)thiourea and 3 milliliters of concentrated hydrochloric acid are admixed in 15 milliliters of ethanol and then refluxed for 1 hour. The reaction mixture thus obtained is a semi-crystalline mass which is cooled, treated with diethyl ether and then filtered to give the reaction product. The reaction product, consisting essentially of the hydrochloride salt of the desired compound, has a typical melting point of 248–250° C. A typical yield of the reaction product is 6.2 grams. The reaction product is made basic with ammonium hydroxide and then recrystallized from ethanol. The product thus obtained consists essentially of 2-imino-3 - (p - hydroxyphenyl) - 4 - methyl - 4 - thiazoline. A typical yield of the product is 4.4 grams. A typical melting point is 194–195° C. A typical analysis of the product is: Calcd. for $C_{10}H_{10}N_2OS$: C, 58.25; H, 4.85; N, 13.59; S, 15.53. Found: C, 58.38; H, 4.91; N, 13.45; S, 15.28.

Example 2

This example illustrates the synthesis of 2-imino-3-(p-methoxyphenyl)-4-methyl-4-thiazoline.

A mixture of 27.3 grams (0.15 mole) of 1-(p-methoxyphenyl)thiourea, 15.3 grams (0.16 mole) of chloroacetone, 15 milliliters of concentrated hydrochloric acid and 75 milliliters of ethanol is refluxed for 1 hour. The mixture thus obtained is cooled, washed with diethyl ether and then made basic with ammonium hydroxide. The solid thus obtained is recrystallized from ethanol to give the desired product which consists essentially of 2-imino-3 - (p - hydroxyphenyl) - 4 - methyl - 4 - thiazoline. A typical melting point of the product is 146–147° C.

Example 3

This example illustrates the synthesis of 2-imino-3-(p-hydroxyphenyl)-4-methyl-5-phenyl-4-thiazoline.

31.9 grams (0.15 mole) of 1-bromo-1-phenyl-2-propanone and 25.2 grams (0.15 mole) of 1-(p-hydroxyphenyl)thiourea, 15 milliliters of concentrated hydrochloric acid and 75 milliliters of ethanol are refluxed together for 1 hour. The reaction mixture is cooled, washed with diethyl ether, filtered, and the filter cake slurried in ammonium hydroxide. The solid material is filtered and recrystallized from ethanol. The product thus obtained consists essentially of 2-imino-3-(p-hydroxyphenyl)-4-methyl-5-phenyl-4-thiazoline.

Example 4

This example illustrates the preparation of 2-(p-hydroxyphenylimino) - 3 - (p-hydroxyphenyl)-4-methyl-4-thiazoline.

A mixture of 12 grams (0.046 mole) of 1,3-bis(p-hydroxyphenyl)thiourea, 4.3 grams (0.046 mole) of chloroacetone and 200 milliliters of ethanol is refluxed for 2 hours. The reaction mixture thus obtained is cooled, filtered and neutralized with ammonium hydroxide to obtain a reaction product. The reaction product after recrystallization from ethanol consists essentially of 2-(p-hydroxyphenylimino) - 3 - (p-hydroxyphenyl)-4-methyl-4-thiazoline. A typical melting point of the product is 243–244° C. A typical analysis of the product is: Calcd. for $C_{16}H_{14}N_2O_2S$: C, 64.43; H, 4.69; N, 9.38; S, 10.74. Found: C, 64.54; H, 4.86; N, 9.32; S, 11.06.

Example 5

This example illustrates the preparation of 2-(p-dimethylaminophenylimino)-3-(p - dimethylaminophenyl)-4-methyl-4-thiazoline.

A mixture of 14.4 grams (0.046 mole) of 1,3-bis(p-dimethylaminophenyl)thiourea, 4.3 grams (0.046 mole) of chloroacetone and 200 milliliters of ethanol is refluxed for 2 hours. The reaction mixture thus obtained is cooled, filtered and neutralized with ammonium hydroxide. The cooled reaction product is then recrystallized from ethanol. The reaction product thus obtained consists essentially of 2-(p-dimethylaminophenylimino)-3-(p-dimethylaminophenyl) - 4 - methyl-4-thiazoline. A typical melting point of the product thus obtained is 206–207° C. A typical analysis for the product is: Calcd. for $C_{20}H_{24}N_4S$: C, 68.18; H, 6.82; N, 15.91; S, 9.09. Found: C, 68.08; H, 7.11; N, 15.95; S, 8.93.

Example 6

This example illustrates the synthesis of 2-(p-methoxy - phenylimino)-3-(p-methoxyphenyl)-4-methyl-4-thiazoline.

A mixture of 13.2 grams (0.046 mole) of 1,3-bis(p-methoxyphenyl)thiourea, 4.3 grams (0.046 mole) of chloroacetone and 200 milliliters of ethanol is refluxed for 2 hours. The reflux mixture is cooled, filtered and the filter cake slurried in ammonium hydroxide. The slurried material is then filtered and then recrystallized from ethanol. The product thus obtained consists essentially of 2-(p-methoxyphenylimino) - 3 - (p - methoxyphenyl)-4-methyl-4-thiazoline. The product has a typical melting point of 147–148° C. A typical analysis of the product is: Calcd. for $C_{18}H_{18}N_2O_2S$: C, 66.26; H, 5.52; N, 8.59; S, 9.81. Found: C, 65.97; H, 5.32; N, 8.63; S, 10.03.

Example 7

This example illustrates the preparation of 2-(p-hydroxyphenylimino) - 3 - (p-hydroxyphenyl)-4-methyl-5-phenyl-4-thiazoline.

A mixture of 12.0 grams (0.046 mole) of 1,3-bis(p-hydroxyphenyl)thiourea, 9.79 grams (0.046 mole) of 1-bromo-1-phenyl-2-propanone and 200 milliliters of ethanol is refluxed for 2 hours. The reaction mixture thus obtained is cooled, filtered, neutralized with ammonium hydroxide and again filtered. The resulting solid product is recrystallized from ethanol. It consists essentially of 2-(p-hydroxyphenylimino) - 3 - (p-hydroxyphenyl)-4-methyl-5-phenyl-4-thiazoline.

Example 8

This example illustrates the synthesis of 2-acetimido-3-(p-methoxyphenyl)-4-methyl-4-thiazoline.

A solution of 20.9 grams (0.1 mole) of 2-imino-3-(p-methoxyphenyl)-4-methyl-4-thiazoline in 10.2 grams (0.1 mole) of acetic anhydride is refluxed for 1 hour. The reaction mixture thus obtained is cooled and filtered to give a reaction product. The reaction product consists essentially of 2-acetimido-3-(p-methoxyphenyl)-4-methyl-4-thiazoline. A typical melting point of the product is 208–210° C.

Example 9

This example illustrates the synthesis of 2-(p-methoxyphenylimino)-3-acetyl-4-methyl-4-thiazoline.

A solution of 20.9 grams (0.1 mole) of 2-(p-anisidino)-4-methylthiazole, 10.2 grams (0.1 mole) of acetic anhydride and 1.0 gram of concentrated sulfuric acid (98%) is refluxed for 1 hour. The reaction mixture thus formed is cooled, filtered and neutralized with ammonium hydroxide. This gives a reaction product consisting essentially of 2-(p-methoxyphenylimino)-3-acetyl-4-methyl-4-thiazoline. A typical melting point of the product is 147–149° C.

Examples 10–12

These examples illustrate specific embodiments of a polyethylene composition of this invention.

The formulations of these specific embodiments are:

| Components | Concentration in Parts by Wt. | | |
|---|---|---|---|
| | Ex. 10 | Ex. 11 | Ex. 12 |
| Normally solid polyethylene | 100 | 100 | 100 |
| 2-(p-dimethylaminophenylimino)-3-(p-dimethylaminophenyl)-4-methyl-4-thiazoline | 1 | | |
| 2-(p-hydroxyphenyl)imino-3-(p-hydroxyphenyl)-4-methyl-4-thiazoline | | 1 | |
| 2-imino-3-(p-hydroxyphenyl)-4-methyl-4-thiazoline | | | 1 |

These specific embodiments are made by hot roll compounding the components of each embodiment, the temperature of the front roll being at 270° F. and the temperature of the rear roll being at 220° F. The specific compositions thus made are useful as materials of construction for articles likely to be exposed to ultraviolet light.

Examples 13–15

These examples illustrate specific embodiments of a normally solid polypropylene composition of this invention.

The formulations of these specific embodiments are:

| Components | Concentration in Parts by Wt. | | |
|---|---|---|---|
| | Ex. 13 | Ex. 14 | Ex. 15 |
| Normally solid polypropylene | 100 | 100 | 100 |
| 2-(p-dimethylaminophenylimino)-3-(p-dimethylaminophenyl)-4-methyl-4-thiazoline | 5 | | |
| 2-(p-hydroxyphenylimino)-3-(p-hydroxyphenyl)-4-methyl-4-thiazoline | | 5 | |
| 2-imino-3-(p-hydroxyphenyl)-4-methyl-4-thiazoline | | | 5 |

Each of these specific embodiments is made by dope compounding. The components are added to tetralin with the ratio of polypropylene to tetralin being 0.4 gram of polypropylene to 10 milliliters of tetralin. The resulting mixture is heated for 30 minutes at 145° C., whereby the components are solubilized in the tetralin. The dope thus obtained can then be cast under conditions leading to evaporation of the tetralin. The specific compositions thus obtained are particularly useful as materials of construction for articles such as film and the like, which are likely to be exposed to ultraviolet light.

Examples 16–18

These examples illustrate specific embodiments of a normally solid poly(1-octadecene) composition of this invention.

The formulations of the specific embodiments are:

| Components | Concentration in Parts by Wt. | | |
|---|---|---|---|
| | Ex. 16 | Ex. 17 | Ex. 18 |
| Normally solid poly(1-octadecene) | 100 | 100 | 100 |
| 2-(p-dimethylaminophenylimino)-3-(p-dimethylaminophenyl)-4-methyl-4-thiazoline | 5 | | |
| 2-(p-hydroxyphenylimino)-3-(p-hydroxyphenyl)-4-methyl-4-thiazoline | | 5 | |
| 2-imino-3-(p-hydroxyphenyl)-4-methyl-4-thiazoline | | | 5 |

The specific embodiments according to these formulations are made by dry blending the normally solid, but finely divided, poly(1-octadecene) with the other components in finely divided condition. In each case the blends thus obtained can be extruded (for example, at 70° C. onto a chilled roll to form a film) to form useful articles which are likely to be exposed to ultraviolet light.

Ultraviolet light stability tests have actually been carried out on samples of a number of these specific embodiments.

In one series of tests the samples were made from a normally solid polyethylene having a melt index of 2.0 (ASTM, D1238–52T) and a density of 0.918. The samples were made from the polyethylene and the additives indicated in the following table. The additives indicated were present in the samples at concentrations of 1% by weight based on the polyethylene. The samples were made according to the procedure described in connection with Examples 10–12. The resultant samples were compression-molded into plates 50 mils thick. Test specimens 2.5 inches x 0.5 inch were cut from the plate and their initial elongations measured. They were then exposed to ultraviolet light in a modified Atlas Twin-Arc Weather-Ometer, Type DLTS [Anal. Chem. 25, 460 (1953)]. Periodically the test specimens were removed and tested for elongation. When a test specimen had reached a 50% reduction in initial elongation, the hours of exposure of the sample in the Atlas Twin-Arc Weather-Ometer were determined. The results are summarized in the following table.

| Sample No. | Additives | Hours of Exposure for 50% Reduction in Initial Elongation |
|---|---|---|
| 1 | None | 150 |
| 2 | 2-(p-dimethylaminophenylimino)-3-(p-dimethylaminophenyl)-4-methyl-4-thiazoline | 360 |
| 3 | 2-(p-hydroxyphenyl)imino-3-(p-hydroxyphenyl)-4-methyl-4-thiazoline | 1,050 |
| 4 | 2-imino-3-(p-hydroxyphenyl)-4-methyl-4-thiazoline | 1,340 |

Samples 2–4 correspond in formulation to the specific embodiments of Examples 10–12.

The test data show that the 2-imino-4-thiazolines of this invention are effective ultraviolet light stabilizers for normally solid polyethylene.

In another test series the samples were made from a normally crystalline polypropylene and the additives indicated in the following table. The concentration of each additive in each sample was 5% by weight based on the polypropylene. The samples were made by the dope procedure described in connection with Examples 13–15. In each case the dope thus obtained was cast onto a ferrotype plate at 143° C. and the tetralin evaporated. Usually 10 minutes of heating time were required to completely evaporate the tetralin. In each case there was obtained a film about 3 mils thick. Test specimens 2.5 inches x 0.5 inch were cut from the films and exposed in the modified Atlas Twin-Arc Weather-Ometer. Periodically the test specimens were removed and inspected for embrittlement by creasing the test specimens with the exposed side of each specimen on the outside of the crease. When a test specimen was found to have developed embrittlement, the number of hours of exposure of that specimen was determined. From the exposure time a stabilization rating for the additive was calculated. The stabilization rating is defined as the ratio of exposure time required to embrittle the film containing the additive to that required to embrittle film containing no additive. The test data are summarized in the following table.

| Sample No. | Additive | Stabilization Rating |
|---|---|---|
| 1 | None | 1.0 |
| 2 | 2-(p-dimethylaminophenylimino)-3-(p-dimethylaminophenyl)-4-methyl-4-thiazoline. | 4.0 |
| 3 | 2-(p-hydroxyphenyl)imino-3-(p-hydroxyphenyl)-4-methyl-4-thiazoline. | 9.0 |
| 4 | 2-imino-3-(p-hydroxyphenyl)-4-methyl-4-thiazoline. | 9.0 |
| 5 | 2-hydroxy-4-methoxybenzophenone | 2.0 |

Samples 2–4 correspond in formulation to the specific embodiments of Examples 13–15.

These data show that the thiazoline and thiazole derivatives of this invention are effective ultraviolet light stabilizers for polypropylene film. All of the 2-imino-4-thiazolines of this invention were better than the benzophenone type ultraviolet light inhibitor. The hydroxyphenyl substituted derivatives of the 2-imino-4-thiazoline compounds of this invention were particularly effective, having stabilization ratings up to 9, which is more than 4 times that found for the benzophenone type stabilizer.

Similar results were obtained in the ultraviolet light stability testing of 10 mil thick film specimens of samples of poly(1-octadecene) compositions containing 2-imino-4-thiazolines of this invention.

Thus, there is provided an ultraviolet light stabilized, thermoplastic composition wherein the thermoplastic component is predominantly a 1-olefin resin.

Other features, advantages and specific embodiments of this invention will be readily apparent to those in the exercise of ordinary skill in the art after reading the foregoing disclosures. In this connection, while specific embodiments of this invention have been described in considerable detail, variations and modifications of these specific embodiments can be effected without departing from the spirit and scope of the invention as described and claimed.

We claim:

1. A thermoplastic composition comprising a normally solid poly-1-olefin resin and a stabilizing amount of a material selected from the 2-imino-4-thiazolines represented by the formula:

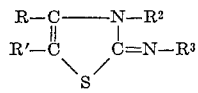

wherein R and R' are radicals independently selected from the group consisting of hydrogen, $C_1$–$C_{18}$ alkyl, phenyl, hydroxyphenyl and ($C_1$–$C_{18}$ alkoxy) phenyl radicals; $R^2$ is a radical selected from the group consisting of ($C_1$–$C_{18}$ alkyl) phenyl, hydroxyphenyl, ($C_1$–$C_{18}$ alkoxy) phenyl, dimethylaminophenyl, dihydroxyphenyl, di($C_1$–$C_{18}$ alkoxy) phenyl, hydroxy ($C_1$–$C_{18}$ alkoxy) phenyl, acyl and aroyl; and $R^3$ is a radical selected from the group consisting of hydrogen, ($C_1$–$C_{18}$ alkyl) phenyl, hydroxyphenyl, ($C_1$–$C_{18}$ alkoxy) phenyl, dimethylaminophenyl, dihydroxyphenyl, di($C_1$–$C_{18}$ alkoxy) phenyl, hydroxy ($C_1$–$C_{18}$ alkoxy) phenyl, acyl and aroyl.

2. The composition of claim 1 wherein said material is present at a concentration in a range of about 0.1 to about 10% by weight of said resin.

3. Shaped articles of a normally solid, thermoplastic composition of claim 1.

4. A normally solid, thermoplastic composition consisting essentially of normally solid polyethylene and 2-(p-dimethylaminophenylimino)-3-(p-dimethylaminophenyl)-4-methyl-4-thiazoline at a concentration in a range from about 0.1 to about 10% by weight of said polyethylene.

5. A normally solid, thermoplastic composition consisting essentially of normally solid polyethylene and 2 - (p - hydroxyphenyl)imino - 3 - (p-hydroxyphenyl)-4-methyl-4-thiazoline at a concentration in a range from about 0.1 to about 10% by weight of said polyethylene.

6. A normally solid, thermoplastic composition consisting essentially of normally solid polyethylene and 2-imino-3-(p-hydroxyphenyl)-4-methyl-4-thiazoline at a concentration in a range from about 0.1 to about 10% by weight of said polyethylene.

7. A normally solid, thermoplastic composition consisting essentially of normally solid polypropylene and 2-(p-dimethylaminophenylimino) - 3 - (p-dimethylaminophenyl)-4-methyl-4-thiazoline at a concentration in a range from about 0.1 to about 10% by weight of said polypropylene.

8. A normally solid, thermoplastic composition consisting essentially of normally solid polypropylene and 2 - (p - hydroxyphenyl)imino - 3 - (p-hydroxyphenyl)-4-methyl-4-thiazoline at a concentration in a range from about 0.1 to about 10% by weight of said polypropylene.

9. A normally solid, thermoplastic composition consisting essentially of normally solid polypropylene and 2-imino-3-(p-hydroxyphenyl)-4-methyl-4-thiazoline at a concentration in a range from about 0.1 to about 10% by weight of said polypropylene.

10. A normally solid, thermoplastic composition consisting essentially of normally solid poly(1-octadecene) and 2-(p-dimethylaminophenylimino) - 3 - (p-dimethylaminophenyl)-4-methyl-4-thiazoline at a concentration in a range from about 0.1 to about 10% by weight of said poly(1-octadecene).

11. A normally solid, thermoplastic composition consisting essentially of normally solid poly(1-octadecene) and 2 - (p-hydroxyphenylimino)-3-(p-hydroxyphenyl)-4-methyl-4-thiazoline at a concentration in a range from about 0.1 to about 10% by weight of said poly(1-octadecene).

12. A normally solid, thermoplastic composition consisting essentially of normally solid poly(1-octadecene) and 2-imino-3-(p-hydroxyphenyl)-4-methyl-4-thiazoline at a concentration in a range from about 0.1 to about 10% by weight of said poly(1-octadecene).

References Cited

UNITED STATES PATENTS 3,192,225   6/1965   Spivack et al. _____ 260—45.8

OTHER REFERENCES

Elenfield (ed.), Heterocyclic Compounds, John Wiley & Sons, Inc., N.Y., 1957, p. 572.

DONALD E. CZAJA, *Primary Examiner.*

M. J. WELSH, *Assistant Examiner.*